United States Patent
Zhang et al.

(10) Patent No.: US 7,471,707 B2
(45) Date of Patent: Dec. 30, 2008

(54) LOW NOISE, INTRA-CAVITY FREQUENCY-DOUBLING MICRO CHIP LASER WITH WIDE TEMPERATURE RANGE

(75) Inventors: Shaofeng Zhang, Shanghai (CN); Yanping Chen, Shanghai (CN); Deng Peng, Shanghai (CN)

(73) Assignee: Photop Technologies, Inc., Fuzhou (CN)

(*) Notice: Subject to any disclaimer, the term of this patent is extended or adjusted under 35 U.S.C. 154(b) by 201 days.

(21) Appl. No.: 10/928,980

(22) Filed: Aug. 27, 2004

(65) Prior Publication Data
US 2006/0045148 A1    Mar. 2, 2006

(51) Int. Cl.
*H01S 3/10* (2006.01)
(52) U.S. Cl. .............................. 372/22; 372/21; 372/105
(58) Field of Classification Search .................. 372/21, 372/22, 105
See application file for complete search history.

(56) References Cited

U.S. PATENT DOCUMENTS

| | | | | |
|---|---|---|---|---|
| 5,809,048 A | * | 9/1998 | Shichijyo et al. | 372/32 |
| 5,905,748 A | * | 5/1999 | Xie | 372/22 |
| 6,021,140 A | * | 2/2000 | Clark et al. | 372/18 |
| 6,154,472 A | * | 11/2000 | MacKinnon et al. | 372/22 |
| 7,158,548 B2 | * | 1/2007 | Cox et al. | 372/22 |
| 2003/0021325 A1 | * | 1/2003 | Masterson et al. | 372/92 |

* cited by examiner

*Primary Examiner*—Minsun Harvey
*Assistant Examiner*—Tod T Van Roy
(74) *Attorney, Agent, or Firm*—Xin Wen

(57) ABSTRACT

A low-noise micro-chip laser includes a diode pump, a gain medium, a nonlinear crystal, and a birefringent material. The gain medium can receive the energy from the diode pump and generate a laser beam at a fundamental wavelength. The nonlinear crystal can generate a frequency-doubled laser beam in response to the laser beam at the fundamental wavelength. To reduce noise in the frequency-doubled laser beam, the birefringent material and the nonlinear crystal in combination are designed to function as a quarter wave plate at the fundamental wavelength.

17 Claims, 3 Drawing Sheets

Schematic presentation of intra cavity frequency doubled laser stable output in broader temperature

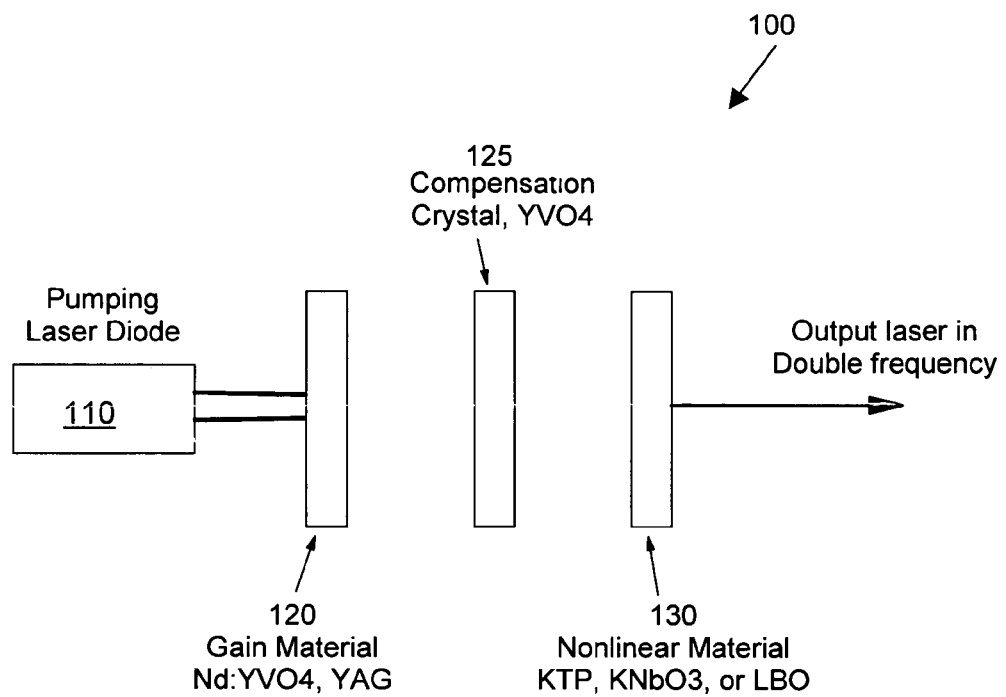
Figure 1 Schematic presentation of intra cavity frequency doubled laser stable output in broader temperature

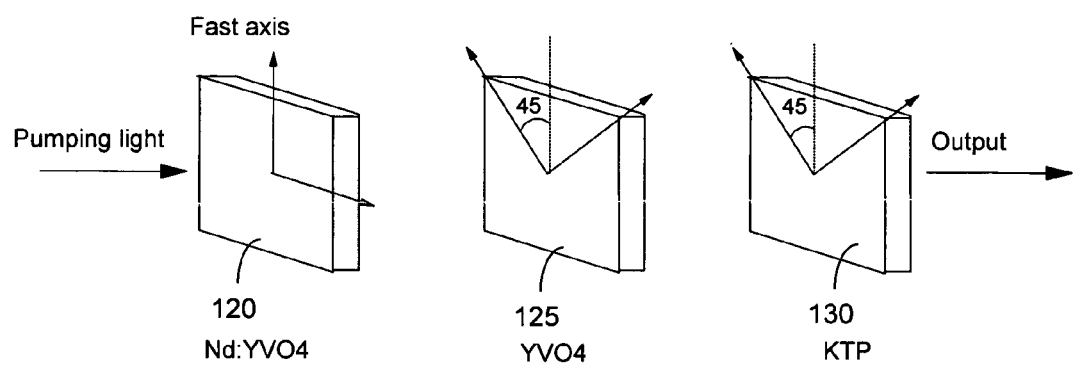
Figure 2 Orientations of crystals in the laser in Figure 1

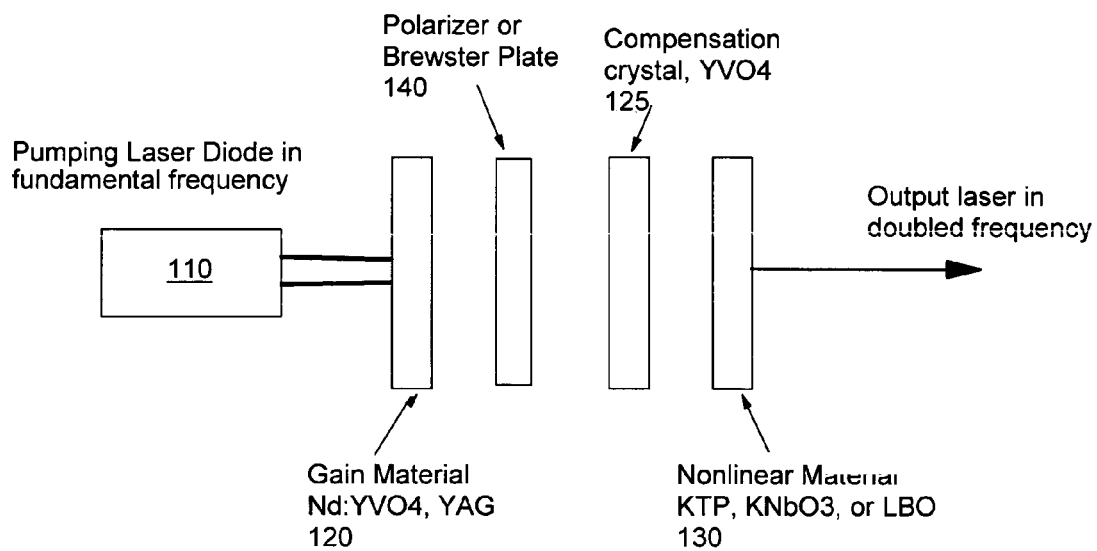
Figure 3 Single longitudinal mode laser in broader temperature

LOW NOISE, INTRA-CAVITY FREQUENCY-DOUBLING MICRO CHIP LASER WITH WIDE TEMPERATURE RANGE

FIELD OF THE INVENTION

The present invention relates generally to an intra-cavity laser source. More particularly, this invention relates to a low noise intra-cavity frequency-doubling microchip laser operable over expanded temperature range.

BACKGROUND OF THE INVENTION

A difficulty for practical applications of intra-cavity frequency-doubling laser sources is that in operation the intra-cavity frequency-doubling laser sources need to be controlled in narrow temperature ranges. The tight temperature control is necessary in order to circumvent a technical problem generally known as the "green noise". The increased applications of the intra-cavity frequency-doubling laser sources have generated an urgent need to remove or relax the temperature-control requirement. Since such laser sources have advantages of compact size, high-energy efficiency, stable frequency, high-quality light beam, low thermal effect, and long lifetime, the lasers source can be readily applied to biomedical fields and display devices. The diode pumped, intra-cavity frequency-doubling lasers can be found in much wider range of applications the laser sources with low noise level are available without the need for tight temperature control. The green noise is generated from the coupling between the longitudinal modes through cross saturation of the gain and sum-frequency mixing. Many attempts have been made to overcome the "green noise" problem and the related temperature-control requirement.

One way to overcome the above described problem is to create a laser system that operates in a single frequency. Such a system can provide an operation condition that could minimize or even totally eliminate the problems of green noise. A drawback of the single frequency operation is low energy efficiency, high cost, and much tighter operation conditions. Single frequency laser operation is thus impractical due to these intrinsic drawbacks.

Another solution to eliminate the green noises is to deal with the root cause of noise generation based on detail investigations of the characteristics of the optical interactions in the processes of optical resonance and frequency doubling taking place in the intra-cavity. In general, a diode pumped, multi-mode intra-cavity frequency-doubling laser with low noise as available now typically includes a birefringent gain medium, specially orientated birefringent nonlinear crystal. If the optical thickness and orientation of both gain medium and non-linear crystal meet certain conditions, the green noise in second harmonic output laser radiation is compressed. However, since the length and the refractive index of nonlinear crystal is strongly temperature-dependent, the conditions for low noise operations are easily broken with variation of environmental temperature. Normally, such a laser requires expensive, high precision temperature controller to keep operation temperature of the laser in around 0.1° C.

Therefore, a need still exists in the art of manufacturing and designing the laser sources to provide configurations and methods to remove such stringent temperature control limitations.

SUMMARY OF THE PRESENT INVENTION

It is therefore an object of the present invention to provide an improved design and configuration to extend temperature range for low noise operation to several decade times wider by introducing a birefringent crystal such that the aforementioned difficulties and limitations in the prior art can be overcome.

Specifically, the intra-cavity frequency-doubling laser includes a specially designed and configured birefringent crystal to compensate the variation in optical length of the nonlinear crystal with temperature and to reduces the numbers of longitudinal modes in the cavity.

In a preferred embodiment, this invention discloses a compact, high efficiency visible laser system that includes a slice of laser gain crystal (e.g., Nd:YVO$_4$ or Nd:Yag) and a slice of nonlinear materials (e.g., KTP). The outside surfaces of the crystals of the combination are properly coated to form oscillation cavity. The two crystals form the laser core that can receive pump energy from a laser diode in the longitudinal direction. Nd:YVO$_4$ is preferred because it is birefringent can provide stability to the intensity of the laser. The KTP is prepared and orientated to facilitate type-II or type I phase matching for the frequency doubling of the radiation at the fundamental frequency. It was found that the green noise can be reduced when the following several conditions are met. The principle axes of the gain and nonlinear crystals are at 45° angles to each other, the nonlinear crystal can be a quarter wave plate (QWP) at the fundamental wavelength. The polarizations of adjacent modes are orthogonal. Since the lights with orthogonal polarization do not couple each other and the coupling between modes are the source of green noise, the micro chip laser can generate stable output.

This invention further provides a method to compensate the dependneces of the length and refractive index on temperature since these parameters are often strongly temperature dependent. While temperature varies, the nonlinear crystal is not quarter wave plate anymore. Additionally, the output wavelength changes with temperature can also contribute some shifting from exact QWP. So the mode coupling occurs and green noise increases. For stable output, the present invention provides a method to expand temperature range of low noise operation for the intra-cavity frequency-doubling laser sources. An additional birefringent material (e.g., YVO$_4$) is introduced into the cavity. Its principle axis is parallel to nonlinear plate (KTP). Since extraordinary index is larger than ordinary index ($n_x > n_o$) in KTP and YVO$_4$, the introduced YVO$_4$ and KTP form a higher order of QWP. However, the variations of index difference ($\Delta n = n_e - n_o$) with temperature having opposite signs in the two crystals. Proper lengths can be designed to keep the crystals as a QWP in much wider temperature range to allow the microchip laser to output a stable radiation in wider range. In this invention, both YVO$_4$ and Nd: YVO$_4$ work as wavelength selector in cavity also, the function is similar to a Lyot filter. If a birefringent filter (e.g., Brewster plate) is added into the cavity between gain material and combined QWP, the laser can work in single frequency.

Briefly, in an embodiment, the present invention includes a diode pumped, intra cavity frequency doubled microchip laser that includes a gain medium, a nonlinear frequency-doubling medium and at least one birefringent medium for temperature compensation. In a preferred embodiment, the gain medium further includes a gain medium composed of Nd:YVO$_4$. In another preferred embodiment, the non-linear frequency-doubling medium further includes a frequency-doubling medium composed of KPT. In another embodiment, the temperature compensation birefringent medium further includes a temperature compensation birefringent medium composed of YVO$_4$. In another embodiment, the temperature compensation birefringent medium and the non-linear frequency-doubling medium optically constitute a combined quarter wave plate relative to a fundamental frequency of an intra-cavity of the microchip laser. In another embodiment, the temperature compensation birefringent medium and the non-linear frequency-doubling medium optically constitute a combined quarter wave plate relative to a fundamental frequency of an intra-cavity of the microchip laser. In another embodiment, the temperature compensation birefringent medium and the non-linear frequency-doubling medium optically constitute a combined quarter wave plate relative to a fundamental frequency of an intra-cavity of the microchip laser. A thickness of the temperature compensation birefringent medium and a thickness of the non-linear frequency-doubling medium are designed for maintaining operation characteristics of the combined quarter wave plate in a predefined temperature range. In another preferred embodiment, the gain medium further includes a gain medium composed of Nd:YAG. In another preferred embodiment, the gain medium further includes a gain non-linear frequency-doubling medium further includes a frequency-doubling medium composed of $KN_bO_3$. In another preferred embodiment, the non-linear frequency-doubling medium further includes a frequency-doubling medium composed of LBO. In another embodiment, the non-linear frequency-doubling medium further includes a frequency-doubling medium composed of KTP. In another preferred embodiment, the temperature compensation birefringent medium further includes temperature compensation birefringent of $YVO_4$. In another embodiment, the temperature compensation birefringent medium further includes a temperature compensation birefringent crystal having a parallel optical axis relative to an optical axis of the non-linear frequency-doubling medium.

These and other objects and advantages of the present invention will no double become obvious to those of ordinary skill in the art after having read the following detailed description of the preferred embodiment, which is illustrated in the various drawing figures.

BRIEF DESCRIPTION OF THE DRAWINGS

FIG. 1 illustrates an intra cavity frequency-doubling laser capable of providing a stable output in broader temperature range.

FIG. 2 illustrates the orientations of the crystals in the laser of FIG. 1.

FIG. 3 illustrates a single longitudinal mode laser in broader temperature range.

DETAILED DESCRIPTION OF THE INVENTION

FIG. 1 is a functional block diagram for depicting the configuration of an intra-cavity frequency doubling laser source 100 of this invention. The frequency doubling laser source 100 includes a pumping laser diode 110 for projecting a laser in a frequency with a corresponding wavelength 808 nm or other sorter wavelength than the fundamental wavelength. For example, the pumping laser emitted from the pumping laser diode 110 can be at a wavelength of 808 nm. The fundamental wavelength can be at 1064 nm. The frequency-doubling laser can be at a wavelength of 532 nm. The laser can transmit through a laser gain medium 120 composed of gain materials such as $Nd:YVO_4$. Opposite to the gain medium 120 is a non-linear material 130 for generating a second harmonic radiation. The non-linear second harmonic generating medium 130 is composed of materials such as KTP. For the purpose of expanding the operation temperature range of the laser source, a temperature compensation crystal 125 is disposed between the laser gain medium 120 and the non-linear material 130. The temperature compensation crystal 125 may be an $YVO_4$ crystal. The frequency-doubling laser 100 as shown may be implemented as a microchip to generate a laser output of different wavelengths such as red, green and blue laser. For the purpose of generating output laser of different wavelengths, the gain materials can be Nd:YAG, the nonlinear materials may be $KNbO_3$, LBO or other kinds of non-linear materials. The temperature compensation plate may be made of other birefringent materials also. It is understood in the art that many possible combination of materials can be implemented according to the disclosed configuration to generate the frequency doubling lasers. The specific examples and the use of designated materials as shown in the embodiments should not be considered as to limit the scopes of this invention.

Referring to FIG. 2, the orientations of the crystals in FIG. 1 are illustrated. The principles axes of the temperature compensation crystal 125, e.g., $YVO_4$, and the non-linear frequency-doubling medium 130, e.g., the KTP crystal, are parallel and are 45° against the optical axes of the gain medium 120, e.g., the $Nd:YVO_4$. The left end of the gain medium 120, e.g., the $Nd:YVO_4$ slice, is coated to transmit the diode laser radiation emitted from the diode laser 110. The coating on the left surface of the gain medium slice 120 can also reflects a laser at the fundamental wavelength of the gain medium-laser of a second harmonic wavelength. For example, a fundamental wavelength is 1.06 μm for a gain medium made of $Nd:YVO_4$. The corresponding second harmonic wavelength is 0.532 μm. The right side of the gain medium 120 is coated to transmit both fundamental and second harmonic wavelengths, but reflect diode laser radiation. Both side surfaces of the temperature compensation crystal 125, e.g., the $YVO_4$ crystal, and the left side of the frequency doubling non-linear medium 130, e.g., the KTP slice, are coated with thin film to transmit both fundamental and second harmonic wavelengths. A method of applying optical glue can also be used and an antireflection (AR) coating is not required on the optically glued surfaces since the crystals have nearly a same refraction index and the reflection loss is small.

The right side of frequency-doubling medium 130, e.g., the KTP crystal, is coated with a thin film layer to transmit a laser output at a second harmonic wavelength and reflect the laser projection at the fundamental wavelength. The gain crystal 120, the nonlinear frequency doubling crystal 130, and the birefringent temperature compensation crystal 125 thus constitute a resonant cavity to double the fundamental frequency. The relative positions of all three slices can be exchanged each other, provided their surface coatings should be changed correspondingly to form resonant cavity for fundamental wavelength and output second harmonic radiations. Additionally, the two end surfaces of the end crystals can be curved to form special types of resonant cavity. Many possible configurations and variations of the basic concept as disclosed are within the scope of the present invention.

Further investigations have indicated noises of output lasers from a laser cavity are closely related to the mode coupling. For the intra-cavity frequency-doubling laser source as described above, there is a strong correspondence between the relative polarizations of modes in the microchip laser cavity and the presence or absence of "green noise". The wavelength and polarizations of modes in the cavity can be described by Jones matrix. In order to generate a stable output from a microchip laser, there is a requirement that the eigenvectors of the Jones matrix must have orthogonal polarizations. In order to achieve the conditions to have orthogonal polarization of eigenvector, it is required that the temperature compensation crystal 125, e.g., the YVO$_4$ palate and the non-linear frequency doubling crystal 130, e.g., the KTP plate, are combined to optically become a quarter wave plate to fundamental wavelength. Under that condition, two eigen states of the Jones matrix are orthogonal each other wherein each eigen state corresponds to one longitudinal mode of the laser cavity. With longitudinal modes orthogonal to each other, the laser cavity as shown provides an advantageous effect to compress the "green noise" that arises from the coupling of longitudinal modes through cross saturation of the gain and sum-frequency mixing since the modes with orthogonal polarization do not couple to each other according to principles of optics.

In order to optically generate a combined quarter wave plate in a wider temperature range, the optical thickness of the KTP crystal and the YVO$_4$ crystal must first satisfy the following equation:

$$nl = l_k \cdot (n_{ke} - n_{ko}) + l_y \cdot (n_{ye} - n_{yo}) = \left(m + \frac{1}{4}\right)\lambda \tag{1}$$

Wherein $l_k$ and $l_y$ are respectively the thicknesses of KTP and YVO$_4$, $n_{ke}$ and $n_{ye}$ are respectively the extraordinary indice for KTP and YVO$_4$, and $n_{ko}$ and $n_{yo}$ are respectively the ordinary indice for KTP and YVO$_4$. All above factors are functions of temperature. M is an integer. M can be selected based on consideration of wavelength selection. Solving above equation can provide the ratio of thicknesses of KTP to YVO$_4$. If m is selected, the thicknesses of KTP and YVO$_4$ can be determined. Although it is hard to keep combined crystal be QWP in all temperature range, test results show that the temperature range of low noise operation in the microchip laser having the disclosed configurations could be explained from 0.1° C. to 4° C. compared to single piece of KTP in this preferred embodiment, $d(n_{ke}-n_{ko})/dT>0$ and $d(n_{ye}-n_{yo})/dT<0$, that guarantees above equation has solutions.

On the left side of equation 1, the first item is the optical length of KTP, and the second item is the optical length of YVO$_4$. Two items form an m order of quarter wave plate to fundamental wavelength. Since $d(n_{kc}-n_{ko})/dT<0$ and $1_k/dT$ is always larger than zero, the first item on the left side of equation increases with the temperature. The combined quarter wave plate is not QWP anymore to fundamental wavelength. However, with an increase in temperature, the second item in the equation decreases since $d(n_{ye}-n_{yo})/dT<0$, even the $1_y/dT$ considering that the thickness variation under temperature is much less than variation in the refractive index. That means that the first item in equation increase with temperature, and the second item decreases with temperature. The total optical length can be kept substantially unchanged in certain temperature range. The combined QWP can perform as a quarter wave plate in a wider temperature range. Many other crystals can be selected as the temperature compensator.

In a preferred embodiment, the optical axes of nonlinear crystal and compensation crystal are parallel, that form a high order QWP. In this case the variation in laser wavelength needs to be considered. Longitudinal mode condition in laser cavity is:

$$NL = n_{nd:y}l_{Nd:y} + n_y l_y + n_k l_k = K\frac{\lambda}{2} \tag{2}$$

Since all above crystals are birefringent, and adjacent mode has orthogonal polarization, equation (2) split into two equations for orthogonal modes that:

$$NL_o = n_{nd:yo}l_{Nd:y} + n_{yo}l_y + n_{ko}l_k = K\frac{\lambda}{2} \tag{3}$$

$$NL_e = n_{nd:ye}l_{Nd:y} + n_{ye}l_y + n_{ke}l_k = K\frac{\lambda}{2} \tag{4}$$

Where $n_{nd:yo}$ and $n_{nd:ye}$ are respectively the ordinary and extraordinary indice of gain medium of Nd:YVO$_4$ and $1_{nd:y}$ is the thickness of the Nd:YVO$_4$ crystal. For temperature stability, the variations of $NL_o$ and $NL_e$ should be zero.

$$\frac{d(NL_O)}{dT} = 0 \tag{5}$$

$$\frac{d(NL_e)}{dT} = 0 \tag{6}$$

No such ideal materials can meet "low noise" conditions in all temperature ranges. It can be reasonably suppose that there is no mode hopping in the operating temperature range so the dK/dT=0. The functional dependencies of the indices on temperature can be determined for the three materials. Therefore the three equations 2, 5, and 6 can determine suitable thickness of each of the three crystals. A microchip laser formed by combination of such crystals can operate with low noise in wider temperature range.

Referring to FIG. 3 for an alternate embodiment, wherein the design as that shown in FIGS. 1 and 2 is implemented in single mode microchip laser. A polarizer 140 is inserted in the cavity to manage the difference between the single-mode laser from the multimode laser. The polarizer 140 can be a Glan-Taylor prism or any other polarization prisms or Brewster plate. It is obvious that other combinations of two even more crystals, which can be either same crystal with orthogonal orientations or different crystals with properly, arranged orientations may be used to achieve the same functional results. There alternates embodiments and variations of different implementation configurations are within the scope of this invention.

This invention therefore discloses a diode pumped, intra cavity frequency-doubling microchip single-frequency laser that includes a gain medium, a nonlinear frequency-doubling medium and a birefringent medium for temperature compensation and birefringent filtering. In a preferred embodiment, the birefringent medium for temperature compensation and birefringent filtering further includes a polarizer. In another preferred embodiment, the polarizer further includes a polarizer including birefringent prisms. In another preferred embodiment, the polarizer further includes a Glan-Taylor polarizer including birefringent prisms. In another preferred embodiment, the birefringent medium for temperature compensation and birefringent filtering further includes a Brewster plate. In another preferred embodiment, the temperature compensation birefringent medium and the non-linear frequency-doubling medium optically constitute a combined quarter wave plate at the fundamental frequency of an intracavity of the microchip laser. In another preferred embodiment, the temperature compensation birefringent medium and the non-linear frequency-doubling medium optically constituting a combined quarter wave plate relative to a fundamental frequency of an intra-cavity of the microchip laser.

The thickness of the temperature compensation birefringent medium and the thickness of the non-linear frequency doubling medium are designed for maintaining an operation characteristics of the combined quarter wave plate in a predefined temperature range.

Although the present invention has been described in terms of the presently preferred embodiment, it is to be understood that such disclosure is not to be interpreted as limiting. Various alternations and modifications will no double become apparent to those skilled in the art after reading the above disclosure. Accordingly, it is intended that the appended claims be interpreted as covering all alternations and modifications as fall within the true spirit and scope of the invention.

We claim:

1. An intra cavity frequency-doubling laser, comprising:
   a gain medium having a first optical axis, the gain medium configured to produce a fundamental lasing light at a fundamental wavelength $\lambda$ along a light propagation direction, wherein the first optical axis is substantially perpendicular to the light propagation direction;
   a nonlinear frequency-doubling medium configured to produce a frequency-doubling lasing light in response to the fundamental lasing light, wherein the nonlinear frequency-doubling medium has a second optical axis substantially perpendicular to the light propagation direction and offsetting at a first non-zero angle relative to the first optical axis; and
   a birefringent medium separate from the gain medium and the nonlinear frequency-doubling medium, wherein the birefringent medium has a third optical axis offsetting at a second non-zero angle relative to the first optical axis, wherein the third optical axis is substantially parallel to the second optical axis, and a combined optical retardation of the non-linear frequency-doubling medium and the birefringent medium is $(m+q)\lambda$ wherein m is an integer and q is substantially $\frac{1}{4}$.

2. The intra cavity frequency-doubling laser of claim 1, wherein the birefringent medium comprises a polarizer, a birefringent prism, a Brewster plate, or a Glan-Taylor polarizer.

3. The intra cavity frequency-doubling laser of claim 1, wherein said non-linear frequency-doubling medium comprises KTP or $YVO_4$.

4. The intra cavity frequency-doubling laser of claim 1, wherein the third optical axis of at about 45 degree angle relative to the first optical axis.

5. The intra cavity frequency-doubling laser of claim 1, wherein said birefringent medium has an optical thickness decreasing with temperature and said non-linear frequency doubling medium has an optical thickness increasing with temperature to maintain said q substantially close to a quarter whereby a temperature induced noise is reduced.

6. The intra cavity frequency-doubling laser of claim 1, wherein the non-linear frequency doubling medium comprises LBO or $KNbO_3$.

7. The intra cavity frequency-doubling laser of claim 1, wherein said gain medium comprises Nd:$YVO_4$ or Nd:YAG.

8. The intra cavity frequency-doubling laser of claim 1, wherein the third optical axis is at about 45 degree angle relative to the first optical axis.

9. The intra cavity frequency-doubling laser of claim 1, wherein the nonlinear frequency-doubling medium has a first optical thickness and the birefringent medium has a second optical thickness that varies with temperature in an opposite trend as the first optical thickness.

10. The intra cavity frequency-doubling laser of claim 9, wherein the first optical thickness and the second optical thickness are so selected that the combined optical retardation of the non-linear frequency-doubling medium and the birefringent medium is substantially unchanged in a predetermined temperature range.

11. The intra cavity frequency-doubling laser of claim 9, wherein the combined optical retardation of the nonlinear frequency-doubling medium increases with temperature and an optical retardation of the birefringent medium decreases with temperature in the predetermined temperature range.

12. An intra cavity frequency-doubling laser, comprising:
    a gain medium configured to produce a fundamental lasing light at a fundamental wavelength $\lambda$ along a light propagation direction, wherein the gain medium has a first optical axis substantially perpendicular to the light propagation direction;
    a nonlinear frequency-doubling medium having a first optical thickness and a second optical axis substantially perpendicular to the light propagation direction, the nonlinear frequency-doubling medium configured to produce a frequency-doubling lasing light in response to the fundamental lasing light; and
    a birefringent medium having a second optical thickness that depends on temperature in an opposite trend as the first optical thickness, wherein a combined optical retardation of the non-linear frequency-doubling medium and the birefringent medium is $(m+q)\lambda$ wherein m is an integer and q is substantially $\frac{1}{4}$, wherein the first optical thickness and the second optical thickness are so selected that the combined optical retardation of the non-linear frequency-doubling medium and the birefringent medium is substantially unchanged in a predetermined temperature range, wherein the birefringent medium has a third optical axis offsetting at a first non-zero angle relative to the first optical axis, wherein the third optical axis is substantially parallel to the second optical axis.

13. The intra cavity frequency-doubling laser of claim 12, wherein the optical retardations of the nonlinear frequency-doubling medium and the birefringent medium vary with temperature in opposite directions in the predetermined temperature range.

14. The intra cavity frequency-doubling laser of claim 13, wherein the optical retardation of the nonlinear frequency-doubling medium increases with temperature and an optical retardation of the birefringent medium decreases with temperature in the predetermined temperature range.

15. The intra cavity frequency-doubling laser of claim 12, wherein the predetermined temperature range is about 4° C.

16. The intra cavity frequency-doubling laser of claim 12, wherein the third optical axis is at about 45 degree angle relative to the first optical axis.

17. The intra cavity frequency-doubling laser of claim 12, wherein the birefringent medium comprises a polarizer, a birefringent prism, a Glan-Taylor polarizer, or a Brewster plate.

* * * * *